United States Patent
Seok et al.

(10) Patent No.: US 10,932,179 B2
(45) Date of Patent: Feb. 23, 2021

(54) SUPPORT OF A-MSDU IN A-MPDU

(71) Applicant: MediaTek Singapore Pte. Ltd., Solaris (SG)

(72) Inventors: Yongho Seok, San Jose, CA (US); Chao-Chun Wang, San Jose, CA (US); Chih-Shi Yee, San Jose, CA (US)

(73) Assignee: MEDIATEK Singapore Pte Ltd., Singapore (SG)

( * ) Notice: Subject to any disclaimer, the term of this patent is extended or adjusted under 35 U.S.C. 154(b) by 3 days.

(21) Appl. No.: 16/115,552

(22) Filed: Aug. 28, 2018

(65) Prior Publication Data
US 2019/0069213 A1 Feb. 28, 2019

Related U.S. Application Data

(60) Provisional application No. 62/550,775, filed on Aug. 28, 2017.

(51) Int. Cl.
H04W 40/12 (2009.01)
H04L 29/08 (2006.01)
(Continued)

(52) U.S. Cl.
CPC ........... H04W 40/12 (2013.01); H04L 1/1835 (2013.01); H04L 1/1896 (2013.01);
(Continued)

(58) Field of Classification Search
CPC . H04W 84/12; H04W 28/0215; H04W 28/18; H04W 28/065; H04W 72/048;
(Continued)

(56) References Cited

U.S. PATENT DOCUMENTS

2006/0239213 A1  10/2006 Frederiks et al. ............. 370/278
2008/0212612 A1   9/2008 Singh et al. .................. 370/474
(Continued)

FOREIGN PATENT DOCUMENTS

WO  WO2016111435 A1  1/2015
WO  WO2017036214 A1  9/2015

OTHER PUBLICATIONS

Taiwan IPO, office action for the TW patent application 107130008 (no English translation is available) dated May 28, 2019 (8 pages).
(Continued)

Primary Examiner — Elton Williams
(74) Attorney, Agent, or Firm — Imperium Patent Works; Mark Marrello

(57) ABSTRACT

A method and apparatus for supporting A-MSDU data transfer in an A-MPDU system includes sending capability information from a first network device, receiving onto the first network device an A-MPDU frame that includes A-MSDU data, and sending an acknowledgment from the first network device. A bit field in the capability information indicates if inclusion of A-MSDU data in an A-MPDU payload is supported. The first network device is a wireless station (STA). The first network device is part of a peer-to-peer network. The A-MSDU is in a data enabled immediate response context. A bit field in the capability information indicates if receiving an A-MPDU frame including A-MSDU data carried in a QoS Data frame without a block acknowledgment agreement is supported.

16 Claims, 7 Drawing Sheets

| B38 | BIT VALUE = 0 | BIT VALUE = 1 |
|---|---|---|
| A-MSDU IN A-MPDU SUPPORT | SET TO 0 WHEN STA DOES *NOT* SUPPORT RECEPTION OF A-MPDU IN WHICH AN A-MSDU IS CARRIED IN A QOS DATA FRAME FOR WHICH NO BLOCK ACK AGREEMENT EXISTS. | SET TO 1 WHEN STA DOES SUPPORT RECEPTION OF A-MPDU IN WHICH AN A-MSDU IS CARRIED IN A QOS DATA FRAME FOR WHICH NO BLOCK ACK AGREEMENT EXISTS. |

A-MSDU IN A-MPDU SUPPORT FIELD DEFINITION

(51) Int. Cl.
*H04L 1/18* (2006.01)
*H04W 84/12* (2009.01)
*H04L 1/16* (2006.01)

(52) U.S. Cl.
CPC .......... *H04L 67/104* (2013.01); *H04L 1/1614* (2013.01); *H04L 1/1621* (2013.01); *H04L 1/1685* (2013.01); *H04W 84/12* (2013.01)

(58) Field of Classification Search
CPC ... H04L 5/0055; H04L 1/1621; H04L 1/1896; H04L 1/1628; H04L 1/1635; H04L 1/1864; H04L 67/104; H04B 7/061
See application file for complete search history.

(56) References Cited

U.S. PATENT DOCUMENTS

| | | | |
|---|---|---|---|
| 2011/0134816 A1* | 6/2011 | Liu | H04L 5/0037 370/310 |
| 2011/0255618 A1 | 10/2011 | Zhu et al. | 375/260 |
| 2011/0305176 A1* | 12/2011 | Wentink | H04L 1/1607 370/310 |
| 2013/0121286 A1 | 5/2013 | Trainin | 370/329 |
| 2017/0201905 A1* | 7/2017 | Trainin | H04W 28/065 |
| 2017/0353887 A1* | 12/2017 | Kim | H04W 28/04 |
| 2018/0183548 A1 | 6/2018 | Gan et al. | |

OTHER PUBLICATIONS

EPO, search report for the EP patent application 18191307.0 dated Jan. 24, 2019 (10 pages).
Taiwan IPO, office action for the TW patent application 107127093 (no English translation is available) dated Jul. 29, 2019 (12 pages).

* cited by examiner

| A-MPDU CONTEXT | A-MSDU IN QOS DATA FRAME WITH HT-IMMEDIATE BLOCK ACK AGREEMENT | A-MSDU IN QOS DATA FRAME WITHOUT HT-IMMEDIATE BLOCK ACK AGREEMENT |
|---|---|---|
| DATA ENABLE IMMEDIATE RESPONSE CONTEXT | 802.11 N/AC: OPTIONAL<br>802.11 AX: OPTIONAL | 802.11 N/AC: N/A<br>802.11 AX: MANDATORY |
| DATA ENABLE NO IMMEDIATE RESPONSE CONTEXT | 802.11 N/AC: N/A<br>802.11 AX: N/A | 802.11 N/AC: N/A<br>802.11 AX: N/A |
| S-MPDU CONTEXT | 802.11 N/AC: OPTIONAL<br>802.11 AX: OPTIONAL | 802.11 N/AC: MANDATORY<br>802.11 AX: MANDATORY |

STANDARD A-MDSU SUPPORT IN AN A-MPDU

FIG. 4

| A-MPDU CONTEXT | A-MSDU IN QOS DATA FRAME WITH HT-IMMEDIATE BLOCK ACK AGREEMENT | A-MSDU IN QOS DATA FRAME WITHOUT HT-IMMEDIATE BLOCK ACK AGREEMENT |
|---|---|---|
| DATA ENABLE IMMEDIATE RESPONSE CONTEXT | 802.11 N/AC: OPTIONAL<br>802.11 AX: OPTIONAL | 802.11 N/AC: N/A<br>802.11 AX: OPTIONAL |
| DATA ENABLE NO IMMEDIATE RESPONSE CONTEXT | 802.11 N/AC: N/A<br>802.11 AX: N/A | 802.11 N/AC: N/A<br>802.11 AX: N/A |
| S-MPDU CONTEXT | 802.11 N/AC: OPTIONAL<br>802.11 AX: OPTIONAL | 802.11 N/AC: MANDATORY<br>802.11 AX: MANDATORY |

IMPROVED A-MDSU SUPPORT IN AN A-MPDU

FIG. 5

| BIT NUMBER | B33 | B34 | B35 | B36 | B37 | B38-B39 |
|---|---|---|---|---|---|---|
| FIELD NAME | QTP SUPPORT | BQR SUPPORT | SR RESPONDER | NDP FEEDBACK REPORT SUPPORT | OPS SUPPORT | RESERVED |
| SIZE (BITS) | 1 | 1 | 1 | 1 | 1 | 2 |

CAPABILITY INFORMATION
WITHOUT A-MSDU IN A-MPDU SUPPORT FIELD

FIG. 6

| BIT NUMBER | B33 | B34 | B35 | B36 | B37 | B38 | B39 |
|---|---|---|---|---|---|---|---|
| FIELD NAME | QTP SUPPORT | BQR SUPPORT | SR RESPONDER | NDP FEEDBACK REPORT SUPPORT | OPS SUPPORT | A-MSDU IN A-MPDU SUPPORT | RES. |
| SIZE (BITS) | 1 | 1 | 1 | 1 | 1 | 1 | 1 |

CAPABILITY INFORMATION
WITH A-MSDU IN A-MPDU SUPPORT FIELD

FIG. 7

| B38 | BIT VALUE = 0 | BIT VALUE = 1 |
|---|---|---|
| A-MSDU IN A-MPDU SUPPORT | SET TO 0 WHEN STA DOES NOT SUPPORT RECEPTION OF A-MPDU IN WHICH AN A-MSDU IS CARRIED IN A QOS DATA FRAME FOR WHICH NO BLOCK ACK AGREEMENT EXISTS. | SET TO 1 WHEN STA DOES SUPPORT RECEPTION OF A-MPDU IN WHICH AN A-MSDU IS CARRIED IN A QOS DATA FRAME FOR WHICH NO BLOCK ACK AGREEMENT EXISTS. |

A-MSDU IN A-MPDU SUPPORT FIELD DEFINITION

FIG. 8

SUPPORT OF A-MSDU IN A-MPDU

CROSS REFERENCE TO RELATED APPLICATIONS

This application claims priority under 35 U.S.C. § 119 from U.S. Provisional Application No. 62/550,775, entitled "Support of A-MSDU in A-MPDU," filed on Aug. 28, 2017, the subject matter of which is incorporated herein by reference.

TECHNICAL FIELD

The disclosed embodiments relate generally to wireless network communications, and, more particularly, to support of A-MSDU in an A-MPDU in wireless local area networks.

BACKGROUND

IEEE 802.11 is a set of media access control (MAC) and physical layer (PHY) specification for implementing wireless local area network (WLAN) communication, in the unlicensed (2.4, 3.6, 5, and 60 GHz) frequency bands. The standards and amendments thereto provide the basis for wireless network products using the IEEE 802.11 frequency bands. IEEE 802.11 plays an important role in the growing need for high bandwidth data communications.

IEEE 802.11 physical layer specification concentrates mainly on wireless transmission and concurrently perform secondary functions like assessing the state of wireless medium and reporting back to the MAC sublayer.

IEEE 802.11 MAC architecture is based on the logical coordination functions that determine who has access to the wireless medium at any given time. The architecture supports fragmentation as well as encryption and act as an interface between Logical Link Control-LLC sublayer and the physical layer.

In 802.11n standard, Frame Aggregation is a very important MAC enhancement, which maximizes throughput and efficiency. There are two methods available to perform frame aggregation.

The first method consists of aggregating MAC Service Data Units (MSDUs) to form an Aggregated MSDU (A-MSDU). Each A-MSDU serves as a single MAC protocol data unit (MPDU). The idea of A-MSDU is to allow multiple MSDUs to be sent to the same receiver concatenated in a single MPDU. This supporting function for A-MSDU within 802.11n is mandatory at the receiver. A-MSDU cannot be used for broadcast and multicast because the Destination Address (DA) and sender Address (SA) in the subframe header must match to same receiver address (RA) and the transmitter address (TA) in the MAC header.

The second method consists of aggregating multiple MPDUs together to form an A-MPDU. The idea of A-MPDU aggregation is to join Multiple MPDU sub frames with a single leading PHY header. A key difference from A-MSDU aggregation is that A-MPDU functions after the MAC header encapsulation process. This method of A-MPDU offers higher MAC throughput compared to the first A-MSDU method.

SUMMARY

In a first novel aspect, a method for supporting A-MSDU data transfer in an A-MPDU system includes sending capability information from a first network device, receiving onto the first network device an A-MPDU frame that includes A-MSDU data, and sending an acknowledgment from the first network device.

In one example, a bit field in the capability information indicates if inclusion of A-MSDU data in an A-MPDU payload is supported.

In another example, the first network device is a wireless station (STA).

In yet another example, the first network device is part of a peer-to-peer network.

In a further example, the A-MSDU is in a data enabled immediate response context.

In another example, a bit field in the capability information indicates if receiving an A-MPDU frame including A-MSDU data carried in a QoS Data frame without a block acknowledgment agreement is supported.

In a second novel aspect, a method for supporting A-MSDU data transfer in an A-MPDU system, includes receiving capability information from a first network device, sending onto the first network device an A-MPDU frame that includes A-MSDU data, and receiving an acknowledgment from the first network device.

In one example, the first network device is a wireless station (STA) and the receiving capability information, the sending onto the first network device an A-MPDU frame, and the receiving an acknowledgment are performed by an Access Point (AP).

In a third novel aspect, a wireless device includes at least one transceiver to exchange data with at least another wireless device, at least one processor, and a memory storing instructions that, when executed by the at least one processor, cause the wireless device to: send capability information from a first network device, receive onto the first network device an A-MPDU frame that includes A-MSDU data, and send an acknowledgment from the first network device.

In one example, the first network device is a wireless station (STA), the first network device is part of a peer-to-peer network, and a bit field in the capability information indicates if inclusion of A-MSDU data in an A-MPDU payload is supported.

Other embodiments and advantages are described in the detailed description below. This summary does not purport to define the invention. The invention is defined by the claims.

BRIEF DESCRIPTION OF THE DRAWINGS

FIG. 4 is a table illustrating standard support for A-MSDU in an A-MPDU.

FIG. 5 is a table illustrating improved support for A-MSDU in an A-MPDU.

FIG. 6 illustrates capability information without an A-MSDU in an A-MPDU support field.

FIG. 7 illustrates capability information with an A-MSDU in an A-MPDU support field.

FIG. 8 illustrates an A-MSDU in an A-MPDU support field definition based on the value of the A-MSDU in an A-MPDU support field value.

DETAILED DESCRIPTION

Reference will now be made in detail to some embodiments of the invention, examples of which are illustrated in the accompanying drawings.

Provided herein are system, apparatus, device, method and/or computer program product embodiments, and/or combinations and sub-combinations thereof, for supporting A-MSDU data transfer in an A-MPDU system a wireless communication protocol. Embodiments operate by generating of capability information, where support of A-MSDU data transfer in an A-MPDU is indicated by the capability information.

Figure 1:
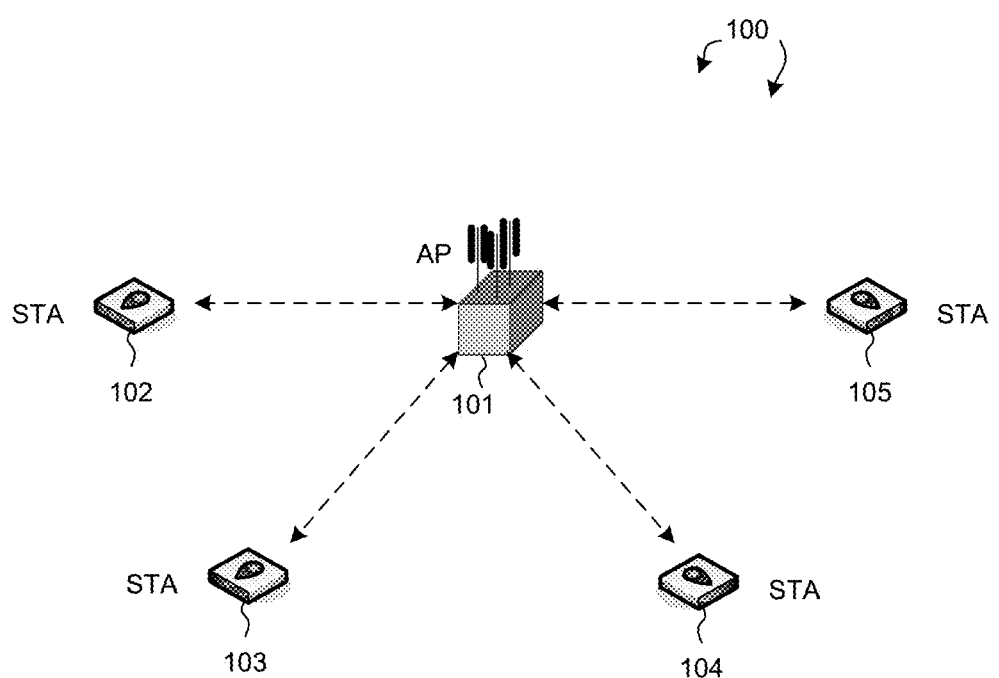
FIG. 1 illustrates a wireless network 100.

FIG. 1 illustrates a wireless network 100. For example, the WLAN may use the IEEE 802.11ax standard (current proposals and/or future versions), or various other wireless communication protocols.

FIG. 1 includes an access point 101 and wireless stations 102-105 that communicate over the WLAN. Access point 101 may be an access point (AP) that transmits and receives frames over the WLAN. Wireless Stations 102-105 may be any wireless communication devices configured to communicate in the WLAN, such as a desktop computer, laptop computer, smart phone, smart device, or various other devices as would be appreciated by a person of ordinary skill in the art.

In some embodiments, access point 101 can connect (communicatively) wireless stations 102 to station 103 within the WLAN. Specifically, station 102 may transmit a frame to station 103 by transmitting the frame to access point 101. Access point 101 may then transmit the frame to station 103. Similarly, station 103 may transmit a frame to station 102 by transmitting the frame to access point 101. Access point 101 may then transmit the frame to station 102.

In some embodiments, stations may transmit and receive frames using block acknowledgment. Specifically, an AP may transmit a block acknowledgement request (BAR) frame to a station. In response, the station may transmit, to the AP, a single block acknowledgement (BA) frame acknowledging receipt of one or more frames. Alternatively, a wireless station can send a block acknowledgment request (BAR) to an AP. In some embodiments, a single BA frame may be solicited in any/all of uplink (UL), downlink (DL), and peer-to-peer transmissions, as well as in unicast and multicast transmissions.

For example, access point 101 may transmit a BAR to station 102. In response, station 102 may acknowledge receipt of one or more frames by transmitting BA to access point 101.

In some embodiments, the BAR may solicit block acknowledgment for multiple frames from station 102. The BAR may include a sequence number of a starting frame being solicited for acknowledgement and a bitmap. A bit in the bitmap may represent a single data frame being solicited for acknowledgment. A sequence number for the frame being solicited for acknowledgment may be equal to the sequence number of the starting frame and the bit number.

In some embodiments, the BA may indicate the data frames received at station 102. Specifically, the BA may include a bitmap that indicates the data frames received. A bit in the bitmap may represent a receipt status of a single data frame solicited for acknowledgment. A bit value of '1' may indicate the corresponding data frame is successfully received. A bit value of '0' may indicate the corresponding data frame is not received.

Similarly, access point 101 may transmit the BAR to wireless station 103. In response, wireless station 103 may acknowledge receipt of one or more frames by transmitting the BA to access point 101.

In some embodiments, the BAR may solicit block acknowledgment for multiple data frames from station 103. The BAR may include a sequence number of a starting data frame being solicited for acknowledgement and a bitmap. A bit in the bitmap may represent a single data frame being solicited for acknowledgment. A sequence number for the data frame being solicited for acknowledgement may be equal to the sequence number of the starting data frame and the bit number.

In some embodiments, the BA may indicate the data frames received at wireless station 103. Specifically, the BA may include a bitmap that indicates the data frames received. A bit in the bitmap may represent a receipt status of a single data frame solicited for acknowledgment. A bit value of '1' may indicate the corresponding data frame is successfully received. A bit value of '0' may indicate the corresponding data frame is not received.

In some embodiments, a wireless station (STA) may transmit a BA frame when no other station uses the wireless channel. In other words, two stations may not transmit BA frames at the same time. This may create network congestion because an excessive number of BAR and BA frames may be transmitted by an access point and one or more stations.

For example, wireless station 102 may not transmit a BA when wireless station 103 is transmitting a BA. In other words, wireless stations 102 and 103 may need to send separate BA frames at separate times to acknowledge receipt of their frames. This may create excessive network congestion.

In some embodiments, the stations 102-105 operate in a data enabled immediate response context where support of an A-MSDU in an A-MPDU is mandatory when a Quality of Services (QoS) data frame does not have a block acknowledgment agreement.

For example, a STA may receive a multi-TID A-MPDU that includes two A-MSDUs. If any of the A-MSDUs do not have a block acknowledgment agreement, then the STA may be required to always support the reception of the A-MSDUs in the received A-MPDU. In the current 802.11 standards there is no mechanism that allows the STA to control whether support of an A-MSDU in an A-MPDU is, or is not, provided by the STA.

Figure 2:
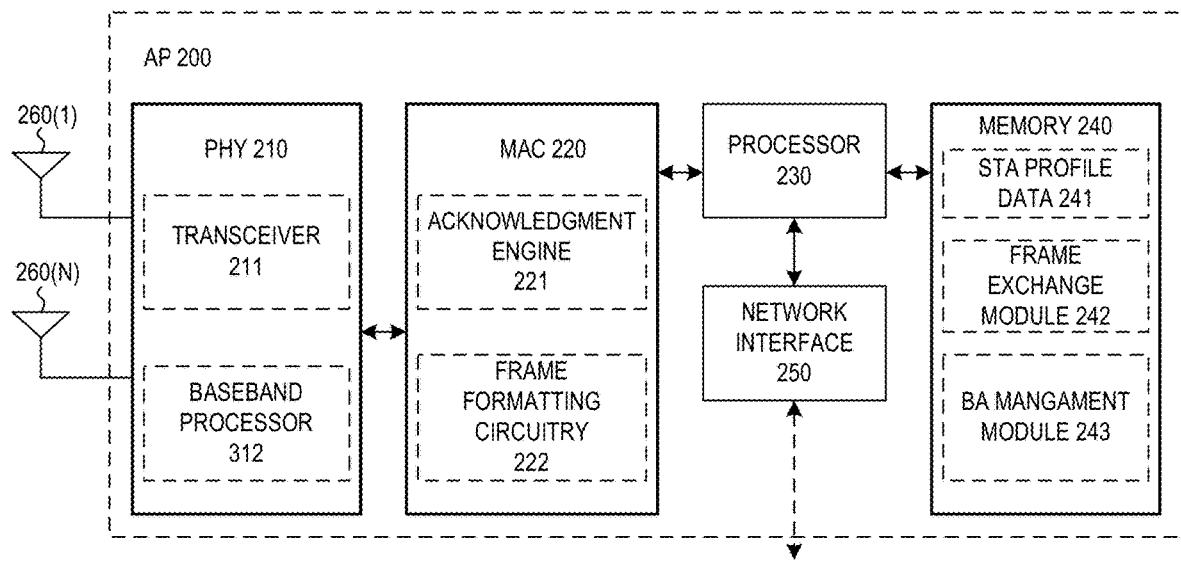
FIG. 2 is a simplified bock diagram of an access point (AP) that can carry out certain embodiments of the invention.

FIG. 2 is a simplified bock diagram of an access point (AP) that can carry out certain embodiments of the invention.

FIG. 2 shows an example AP 200 that may be one embodiment of the AP 101 of FIG. 1. AP 200 may include a PHY device 210 including at least a number of transceivers 211 and a baseband processor 212, may include a MAC 220 including at least a number of acknowledgement engines 221 and frame formatting circuitry 222, may include a processor 230, may include a memory 240, may include a network interface 250, and may include a number of antennas 260(1)-260(N). The transceivers 211 may be coupled to antennas 260(1)-260(N), either directly or through an antenna selection circuit (not shown for simplicity). The transceivers 211 may be used to communicate wirelessly with one or more wireless stations (STAs), with one or more other access points (APs), and/or with other suitable devices. Although not shown in FIG. 2 for simplicity, the transceivers 211 may include any number of transmit chains to process and transmit signals to other wireless devices via antennas 260(1)-260(N), and may include any number of receive chains to process signals received from antennas 260(1)-260(N). Thus, for example embodiments, the AP 200 may be configured for MIMO operations including, for example, SU-MIMO operations and MU-MIMO operations.

The baseband processor 212 may be used to process signals received from processor 230 and/or memory 240 and to forward the processed signals to transceivers 211 for transmission via one or more of antennas 260(1)-260(N), and may be used to process signals received from one or more of antennas 260(1)-260(N) via transceivers 211 and to forward the processed signals to processor 230 and/or memory 240.

The network interface 250 may be used to communicate with a WLAN server (not shown for simplicity) either directly or via one or more intervening networks and to transmit signals.

Processor 230, which is coupled to PHY device 210, to MAC 220, to memory 240, and to network interface 250, may be any suitable one or more processors capable of executing scripts or instructions of one or more software programs stored in AP 200 (e.g., within memory 2). For purposes of discussion herein, MAC 220 shown in FIG. 2 is coupled between PHY device 210 and processor 230. In other embodiments, PHY device 210, MAC 220, processor 230, memory 240, and/or network interface 250 may be connected together using one or more buses (not shown for simplicity).

The Acknowledgment/Contention engines 221 may contend for access to the shared wireless medium, and may also store packets for transmission over the shared wireless medium. The Acknowledgment/Contention engines 221 may be a single module or circuitry to perform acknowledgment and contention functions, or separate modules or circuitries to perform acknowledgment and contention functions, respectively. For some embodiments, AP 200 may include one or more acknowledgment engines 221 to determine what acknowledgment requests are sent based at least in part on a plurality of different access categories. For other embodiments, the acknowledgment engines 221 may be separate from MAC 220. For still other embodiments, the acknowledgment engines 221 may be implemented as one or more software modules (e.g., stored in memory 240 or within memory provided within MAC 220) containing instructions that, when executed by processor 230, perform the functions of acknowledgment engines 221.

The frame formatting circuitry 222 may be used to create and/or format frames received from processor 230 and/or memory 240 (e.g., by adding MAC headers to PDUs provided by processor 230), and may be used to re-format frames received from PHY device 210 (e.g., by stripping MAC headers from frames received from PHY device 210).

Memory 240 may include a STA profile data store 241 that stores profile information for a plurality of STAs. The profile information for a particular STA may include information including, for example, its MAC address, supported data rates, supported channel access protocols, connection history with the STA, and/or any other suitable information pertaining to or describing the operation of the STA.

Memory 240 may also include a BA session store 244 that stores BA session information (e.g., BA policies, BA timeout values, buffer sizes, aggregation policies, TID values, support of an A-MSDU in an A-MPDU, and so on) for a number of active BA sessions between AP 300 and other wireless devices. For at least some embodiments, the BA session store 244 may also store BA session information for a number of previous or inactive BA sessions between AP 200 and other wireless.

Memory 240 may also include a non-transitory computer-readable medium (e.g., one or more nonvolatile memory elements, such as EPROM, EEPROM, Flash memory, a hard drive, and so on) that may store at least the following software (SW) modules: a frame formatting and exchange software module 242 to facilitate the creation and exchange of any suitable frames (e.g., data frames, action frames, and management frames) between AP 20 and other wireless devices; and a BA session management software module 243 to facilitate the establishment, operation, and/or tear-down of block acknowledgment sessions used by AP 200 in communications with one or more other STAs or APs.

Each software module includes instructions that, when executed by processor 230, cause AP 200 to perform the corresponding functions. The non-transitory computer-readable medium of memory 240 thus includes instructions for performing all or a portion of the AP-side operations depicted in FIGS. 4-11.

Processor 230 may execute the frame formatting and exchange software module 242 to facilitate the creation and exchange of any suitable frames (e.g., data frames, action frames, and management frames) between AP 200 and other wireless devices. Processor 230 may also execute the frame formatting and exchange software module 242 to create block acknowledgement IEs that may include BA session information (e.g., BA policies, BA timeout values, buffer sizes, aggregation policies, TID values, support of an A-MSDU in an A-MPDU and so on) and/or to embed or otherwise insert the block acknowledgement IEs into association response frames, ADDBA request frames, ADDBA response frames, and/or DELBA frames to be transmitted to other wireless devices. Processor 230 may also execute the BA session management software module 243 to facilitate the establishment, operation, and teardown of block acknowledgment sessions used by AP 200 in communications with one or more other STAs or APs.

Figure 3:
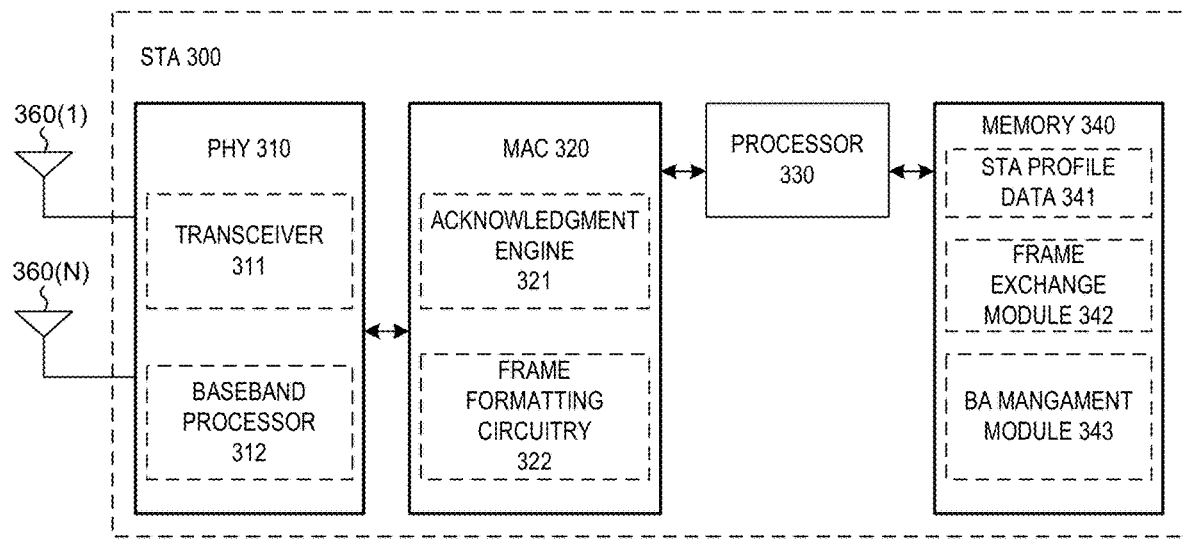
FIG. 3 is a simplified bock diagram of a wireless station (STA) point that can carry out certain embodiments of the invention.

FIG. 3 shows an example STA 300 that may be one embodiment of one or more of the wireless stations 102-105 of FIG. 1. The STA 300 may include a physical layer (PHY) device 310 including at least one transceivers 311 and a baseband processor 312, may include a MAC 320 including at least a number of Acknowledgment/Contention engines 321 and frame formatting circuitry 322, may include a processor 330, may include a memory 340, and may include a number of antennas 350(1)-350(N). The Acknowledgment/Contention engines 321 may be a single module or circuitry to perform acknowledgment and contention functions, or separate modules or circuitries to perform acknowledgment and contention functions, respectively. The transceivers 311 may be coupled to antennas 350(1)-350(N), either directly or through an antenna selection circuit (not shown for simplicity). The transceivers 311 may be used to transmit signals to and receive signals from AP 101 and/or other STAs (see also FIG. 1), and may be used to scan the surrounding environment to detect and identify nearby access points and/or other STAs (e.g., within wireless range of STA 300). Although not shown in FIG. 3 for simplicity, the transceivers 311 may include any number of transmit chains to process and transmit signals to other wireless devices via antennas 350(1)-350(N), and may include any number of receive chains to process signals received from antennas 350(1)-350(N). Thus, for example embodiments, the STA 300 may be configured for multiple-input, multiple-output (MIMO) operations. The MIMO operations may include single-user MIMO (SU-MIMO) operations and multi-user MIMO (MU-MIMO) operations.

The baseband processor 312 may be used to process signals received from processor 330 and/or memory 340 and to forward the processed signals to transceivers 311 for transmission via one or more of antennas 350(1)-350(N), and may be used to process signals received from one or more of antennas 350(1)-350(N) via transceivers 311 and to forward the processed signals to processor 330 and/or memory 340.

For purposes of discussion herein, MAC 320 is shown in FIG. 3 as being coupled between PHY device 310 and processor 330. For actual embodiments, PHY device 310, MAC 320, processor 330, and/or memory 340 may be connected together using one or more buses (not shown for simplicity).

The acknowledgment engines 321 may determine what type of acknowledgment requests are to be sent based at least in part on the priority level of the data transmitted. The STA 300 may include one or more acknowledgment engines 321 for each of a plurality of different access categories. For other embodiments, the acknowledgment engines 321 may be separate from MAC 320. For still other embodiments, the Acknowledgment/Contention engines 321 may be implemented as one or more software modules (e.g., stored in memory 340 or stored in memory provided within MAC 320) containing instructions that, when executed by processor 330, perform the functions of Acknowledgment/Contention engines 321.

The frame formatting circuitry 322 may be used to create and/or format frames received from processor 330 and/or memory 340 (e.g., by adding MAC headers to PDUs provided by processor 330), and may be used to re-format frames received from PHY device 310 (e.g., by stripping MAC headers from frames received from PHY device 310).

Memory 340 may include an AP profile data store 341 that stores profile information for a plurality of APs. The profile information for a particular AP may include information including, for example, the AP's service set identification (SSID), MAC address, channel information, received signal strength indicator (RSSI) values, throughput values, channel state information (CSI), supported data rates, supported channel access protocols, connection history with the AP, a trustworthiness value of the AP (e.g., indicating a level of confidence about the AP's location, etc.), and/or any other suitable information pertaining to or describing the operation of the AP. Memory 340 may also include a BA session store 344 that stores BA session information (e.g., BA policies, BA timeout values, buffer sizes, aggregation policies, TID values, support of an A-MSDU in an A-MPDU and so on) for a number of active BA sessions between STA 300 and other wireless devices. For at least some embodiments, the BA session store 344 may also store BA session information for a number of previous or inactive BA sessions between STA 300 and other wireless devices.

Memory 340 may also include a non-transitory computer-readable medium (e.g., one or more nonvolatile memory elements, such as EPROM, EEPROM, Flash memory, a hard drive, and so on) that may store at least the following software (SW) modules: a frame formatting and exchange software module 342 to facilitate the creation and exchange of any suitable frames (e.g., data frames, action frames, and management frames) between STA 300 and other wireless devices; and a BA session management software module 343 to facilitate the establishment, operation, and/or teardown of block acknowledgment sessions used by STA 300 in communications with one or more other STAs or APs.

Each software module includes instructions that, when executed by processor 330, cause STA 300 to perform the corresponding functions. The non-transitory computer-readable medium of memory 340 thus includes instructions for performing all or a portion of the STA-side operations depicted in FIGS. 4-11.

Processor 330, which is shown in the example of FIG. 3 as coupled to PHY device 310, to MAC 320, and to memory 340, may be any suitable one or more processors capable of executing scripts or instructions of one or more software programs stored in STA 300 (e.g., within memory 340). For example, processor 330 may execute the frame formatting and exchange software module 342 to facilitate the creation and exchange of any suitable frames (e.g., data frames, action frames, and management frames) between STA 300 and other wireless devices. The frame formatting and exchange software module 342 may be also be executed by processor 330 to create block acknowledgement IEs that may include BA session information (e.g., BA policies, BA timeout values, buffer sizes, aggregation policies, TID values, support of an A-MSDU in an A-MPDU and so on) and/or to embed or otherwise insert the block acknowledgement IEs into association request frames, ADDBA request frames, ADDBA response frames, and/or DELBA frames to be transmitted to other wireless devices. Processor 330 may also execute the BA session management software module 342 to facilitate the establishment, operation, and teardown of block acknowledgment sessions used by STA 300 in communications with one or more other STAs or APs.

FIG. 4 is a table illustrating the scenarios in which support of A-MSDU in an A-MPDU is optional or mandatory. The table lists three different A-MPDU contexts. The table of FIG. 4 also lists two different block agreement scenarios. In the first scenario, an A-MSDU is in a QoS data frame with High Throughput (HT) immediate block acknowledgment agreement in place. In the second scenario, an A-MSDU is in a QoS data frame without High Throughput (HT) immediate block acknowledgement agreement in place.

The first A-MPDU context is "Data Enabled Immediate Response" context, which is when an A-MPDU is transmitted outside a PSMP sequence by a TXOP holder or an RD responder including potential immediate responses. In the "Data Enabled Immediate Response" context when there is an A-MSDU in a QoS frame with an HT-immediate block acknowledgement agreement, support of an A-MSDU in an A-MPDU is optional for 802.11n, 802.11ac, and 802.11ax. The support of an A-MSDU in an A-MPDU is optional because an A-MSDU can be carried in a QoS data frame if the recipient indicates the support of an A-MSDU, by the A-MSDU Supported subfield of the Block Acknowledgement Parameter Set field being set to "1" by a STA to indicate that it supports an A-MSDU carried in a QoS Data frame sent under this block acknowledgment agreement. Alternatively, the A-MSDU Supported subfield of the Block Acknowledgement Parameter Set field being set to "0" by a STA to indicate that it does not support an A-MSDU carried in a QoS Data frame sent under this block acknowledgment agreement.

In the "Data Enabled Immediate Response" context when there is an A-MSDU in a QoS frame without an HT-immediate block acknowledgement agreement, support of an A-MSDU in an A-MPDU is not available for 802.11n and 802.11ac because an A-MSDU cannot be carried in a QoS data frame because the A-MSDU Present subfield of a QoS data frames without a block acknowledgment agreement is constrained to "0" in the baseline 802.11 specification.

In the "Data Enabled Immediate Response" context when there is an A-MSDU in a QoS frame without an HT-immediate block acknowledgement agreement, support of an A-MSDU in an A-MPDU is mandatory for 802.11ax because A-MSDU can be carried in a QoS data frame without HT-immediate block acknowledgment agreement. This A-MPDU content is supported by the Multi-STA block agreement introduced by 802.11ax. However, because there is no signaling mechanism (e.g., block acknowledgement agreement) to indicate whether the STA supports an A-MSDU in A-MPDU or not, support by the STA is mandatory. In Multi-TID A-MPDU, it is a mandatory support when the acknowledgement Enabled Multi-TID A-MPDU Support subfield is equal to "1".

The second A-MPDU context is "Data Enabled No Immediate Response" context, which is when an A-MPDU is transmitted outside a PSMP sequence by a TXOP holder that does not include or solicit an immediate response. In the "Data Enabled No Immediate Response" context support for A-MSDU in an A-MPDU is not applicable (N/A) because an A-MSDU cannot be carried in a QoS data frame because the A-MSDU present subfield of a QoS data frames without a block acknowledgment agreement is constrained to "0" in the baseline 802.11 specification.

The third A-MPDU context is "S-MPDU" context, which is a Single Medium Access Control (MAC) Protocol Data Unit context. In the "S-MPDU" context support for A-MSDU in an A-MPDU is optional 802.11n, 802.11ac, and 802.11ax because a QoS Data frame with acknowledgment policy equal to Implicit Block acknowledgment Request is still optionally supported if the recipient indicates the support of an A-MSDU.

In the "S-MPDU" context support for A-MSDU in an A-MPDU is mandatory in 802.11n, 802.11ac, and 802.11ax because the standard requires that a STA shall support the reception of an A-MSDU, where the A-MSDU is carried in a QoS Data frame with acknowledgment Policy equal to Normal acknowledgment in the following cases: (i) by an HT STA when the A-MSDU is not aggregated within an A-MPDU, and (ii) by a VHT STA when the A-MSDU is sent as an S-MPDU.

There are multiple reasons why it is not advantageous to make support of A-MSDU in an A-MPDU is mandatory in 802.11ax in the "Data Enabled Immediate Response" context when there is an A-MSDU in a QoS frame without an HT-immediate block acknowledgement agreement. For example, hardware complexity can be greatly reduced when support of A-MSDU in an A-MPDU is not mandatory in 802.11ax in the "Data Enabled Immediate Response" context when there is an A-MSDU in a QoS frame without an HT-immediate block acknowledgement agreement. The maximum MSDU size is 2304 bytes, while the A-MSDU size can be 3,839 bytes, 7,991 bytes, or even 11,454 bytes. When the A-MSDU in the A-MPDU is mandatory, the required STA buffer size is significantly increased. Said another way, mandatory support of A-MSDU in an A-MPDU results in a significance increase in required STA buffer space.

In an improved system, support of A-MSDU in an A-MPDU is not mandatory, but rather optional in 802.11ax in the "Data Enabled Immediate Response" context when there is an A-MSDU in a QoS frame without an HT-immediate block acknowledgement agreement. The improved system is illustrated in the table of FIG. 5.

The improvement of FIG. 5 may be achieved by use of a new capability information, but we first look at a capability information without A-MSDU in A-MPDU support field illustrated in FIG. 6. The capability information without A-MSDU in A-MPDU support field, includes the following fields: QTP support, BQR support, SR responder, NDP feedback report support, OPS support, and two reserve bits B38 and B39.

FIG. 7 illustrated a new capability information with an A-MSDU in A-MPDU support field. The new capability information users a previously reserved bit to be used as an "A-MSDU in A-MPDU Support" field. The "A-MSDU in A-MPDU Support" field is used by the STA to indicate if the STA supports A-MSDU in A-MPDU communication or not. In one embodiment, setting the "A-MSDU in A-MPDU Support" field to a logic "1" state implies that the STA does support A-MSDU in A-MPDU communication, and setting the "A-MSDU in A-MPDU Support" field to a logic "0" state implies that the STA does not support A-MSDU in A-MPDU communication. One skilled in the art will readily appreciate that different bit locations and different bit values can be used to communicate the same information.

FIG. 8 is a table illustrating the definition of the A-MSDU in A-MPDU Support field. In the example illustrated in FIG. 8, setting the A-MSDU in A-MPDU Support filed to a logic "0" implies that the STA does not support reception of A-MPDU in which an A-MSDU is carried in a QoS data frame for which no block acknowledgement agreement exists. Alternately, setting the A-MSDU in A-MPDU Support filed to a logic "1" implies that the STA does support reception of A-MPDU in which an A-MSDU is carried in a QoS data frame for which no block acknowledgement agreement exists.

Figure 9:
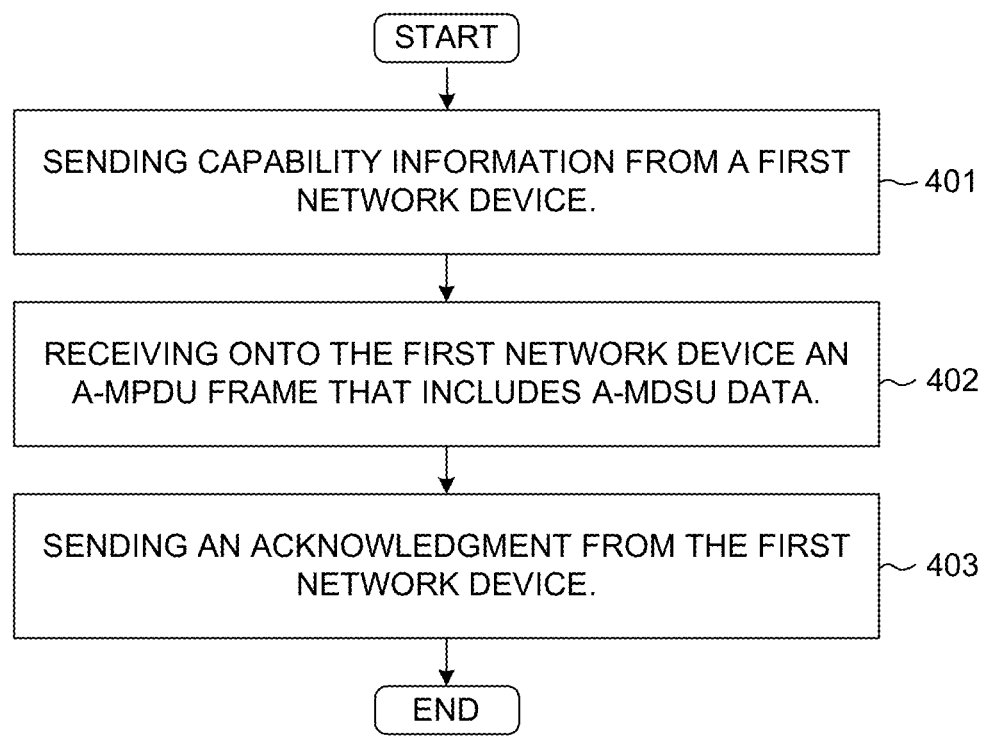
FIG. 9 is a flowchart of method for supporting A-MSDU data transfer in an A-MPDU system.

FIG. 9 is a flow chart of supporting A-MSDU data transfer in an A-MPDU system in accordance with one novel aspect. In step 401, capability information is sent from a first network device. In step 402, A-MPDU frame that includes A-MSDU data is received onto the first network device. In step 403, an acknowledgment is sent from the first network device. In this fashion, support of A-MSDU data transfer in an A-MPDU system is accomplished.

Figure 10:
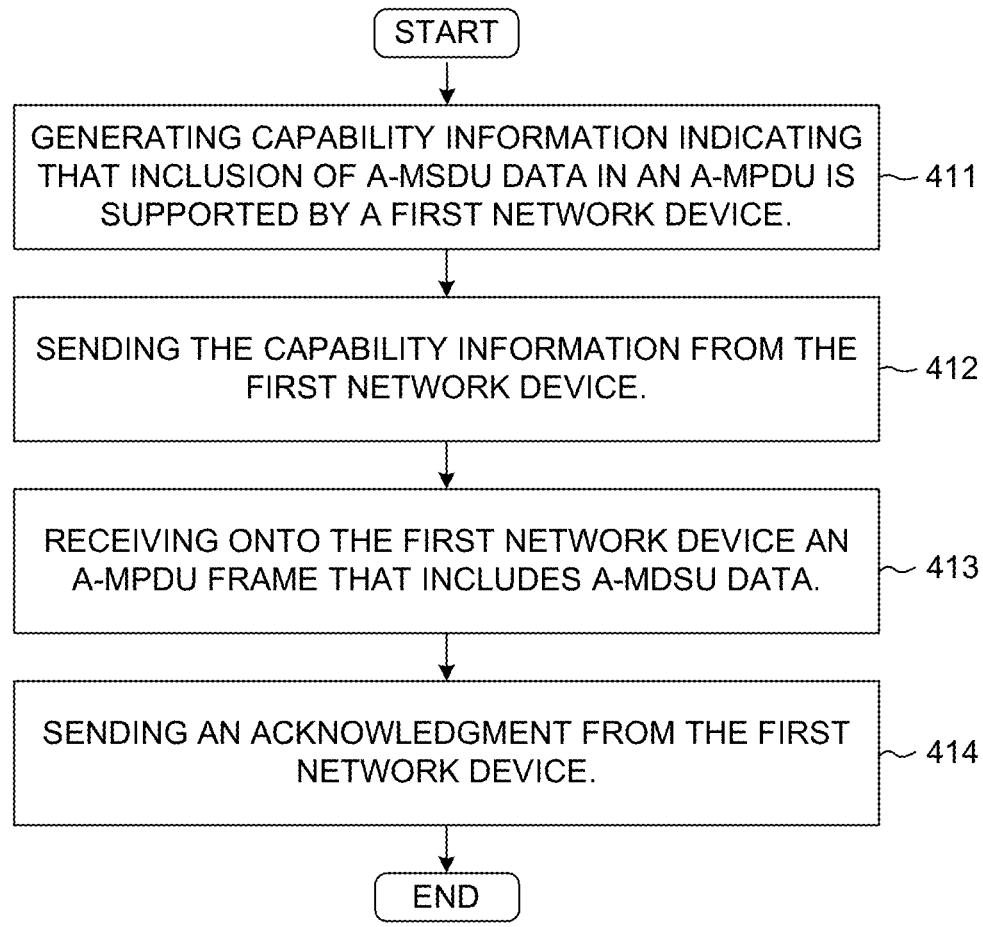
FIG. 10 is a method for supporting A-MSDU data transfer in an A-MPDU system including the generating of capability information, where A-MSDU data transfer in an A-MPDU is supported.

FIG. 10 is a flow chart of supporting A-MSDU data transfer in an A-MPDU system in accordance with one novel aspect. In step 411, capability information indicating that inclusion of A-MSDU data in and A-MPDU is supported by a first network device. In step 412, the capability information is sent from a first network device. In step 413, A-MPDU frame that includes A-MSDU data is received onto the first network device. In step 414, an acknowledgment is sent from the first network device. In this fashion, support of A-MSDU data transfer in an A-MPDU system is accomplished.

Figure 11:
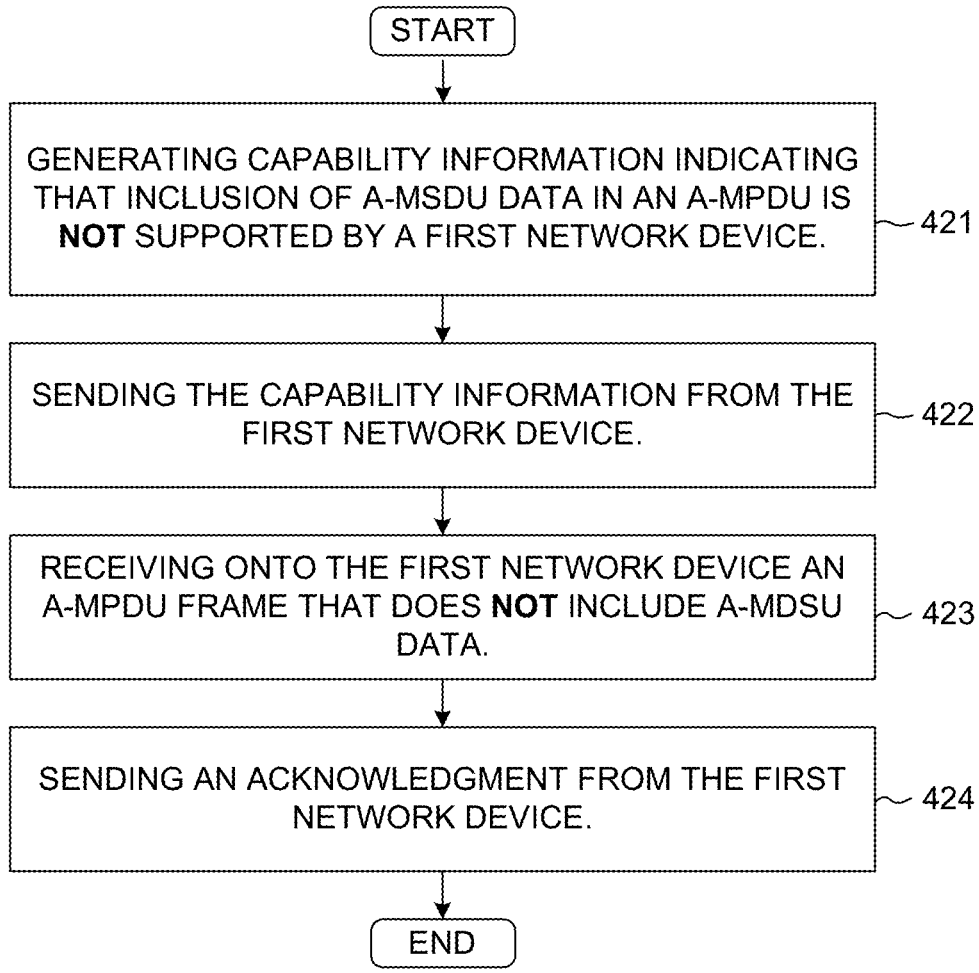
FIG. 11 is a method for supporting A-MSDU data transfer in an A-MPDU system including the generating of capability information, where A-MSDU data transfer in an A-MPDU is not supported.

FIG. 11 is a flow chart of supporting A-MSDU data transfer in an A-MPDU system in accordance with one novel aspect. In step 421, capability information indicating that inclusion of A-MSDU data in and A-MPDU is not supported by a first network device. In step 422, the capability information is sent from a first network device. In step 423, A-MPDU frame that does not include A-MSDU data is received onto the first network device. In step 424, an acknowledgment is sent from the first network device. In this fashion, lack of support of A-MSDU data transfer in an A-MPDU system is accomplished.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a wireless system, comprising:
   (a) sending a first packet from a first network device, wherein the first packet includes capability information;
   (b) receiving an Aggregate MAC Protocol Data Unit (A-MPDU) frame by the first network device, wherein the A-MPDU frame includes an Aggregate MAC Service Data Unit (A-MSDU) data; and
   (c) sending an acknowledgment from the first network device, wherein a bit field in the capability information indicates if receiving an A-MPDU frame including A-MSDU data carried in a Quality of Service (QoS) Data frame without a block acknowledgment agreement is supported, and wherein the QoS data frame does not have a block acknowledgment agreement with a peer communication device.

2. The method of claim 1, wherein a bit field in the capability information indicates that inclusion of A-MSDU data in an A-MPDU payload is supported.

3. The method of claim 1, wherein the first network device is a wireless station (STA) in the wireless system.

4. The method of claim 1, wherein the wireless system is a peer-to-peer network system.

5. The method of claim 1, wherein the A-MSDU is in a data enabled immediate response context.

6. The method of claim 1, wherein the A-MSDU carries a Quality of Service (QoS) Data frame.

7. A method for wireless system, comprising:
   (a) receiving capability information from a first network device;
   (b) sending an Aggregate MAC Protocol Data Unit (A-MPDU) frame that includes an Aggregate MAC Service Data Unit (A-MDSU) data to the first network device; and
   (c) receiving an acknowledgment from the first network device, wherein a QoS data frame does not have a block acknowledgment agreement with a peer communication device, wherein a bit field in the capability information indicates that receiving an A-MPDU frame including A-MSDU data carried in a QoS Data frame without a block acknowledgment agreement is supported.

8. The method of claim 7, wherein the first network device is a wireless station (STA) in the wireless system.

9. The method of claim 7, wherein steps (a) through (c) are performed by an Access Point (AP).

10. The method of claim 7, wherein the wireless system is a peer-to-peer network system.

11. The method of claim 9, wherein the AP is part of a peer-to-peer network.

12. The method of claim 7, wherein a bit field in the capability information indicates that inclusion of A-MSDU data in an A-MPDU payload is supported.

13. The method of claim 7, wherein the A-MSDU is in a data enabled immediate response context.

14. The method of claim 7, wherein the A-MSDU comprises a QoS Data frame.

15. A wireless device, comprising:
   a transceiver to exchange data with another wireless device;
   a processor; and
   a memory storing instructions that, when executed by the processor, cause the wireless device to:
   (a) send capability information from a first network device;
   (b) receive onto the first network device an A-MPDU frame that includes A-MDSU data; and
   (c) send an acknowledgment from the first network device, wherein a QoS data frame does not have a block acknowledgment agreement with a peer communication device, wherein a bit field in the capability information indicates if receiving the A-MPDU frame including A-MSDU data carried in a Quality of Service (QoS) Data frame without a block acknowledgment agreement is supported.

16. The wireless device of claim 15, wherein the first network device is a wireless station (STA), and wherein first network device is part of a peer-to-peer network.

* * * * *